(12) United States Patent
Masciantonio et al.

(10) Patent No.: US 9,925,598 B2
(45) Date of Patent: Mar. 27, 2018

(54) VIBRATORY MACHINING DEVICE

(71) Applicants: CENTRE TECHNIQUE DES INDUSTRIES MECANIQUES, Senlis (FR); AMVALOR, Paris (FR)

(72) Inventors: Ugo Masciantonio, Proville (FR); George Moraru, Aix-en-Provence (FR)

(73) Assignees: CENTRE TECHNIQUE DES INDUSTRIES MECANIQUES (FR); AMVALOR (FR)

( * ) Notice: Subject to any disclaimer, the term of this patent is extended or adjusted under 35 U.S.C. 154(b) by 331 days.

(21) Appl. No.: 14/896,255

(22) PCT Filed: Jun. 5, 2014

(86) PCT No.: PCT/FR2014/051350
§ 371 (c)(1),
(2) Date: Dec. 4, 2015

(87) PCT Pub. No.: WO2014/195647
PCT Pub. Date: Dec. 11, 2014

(65) Prior Publication Data
US 2016/0129505 A1 May 12, 2016

(30) Foreign Application Priority Data
Jun. 6, 2013 (FR) .................. 13 55224

(51) Int. Cl.
*H01L 41/08* (2006.01)
*B23B 37/00* (2006.01)
(Continued)

(52) U.S. Cl.
CPC ............. *B23B 37/00* (2013.01); *B23B 47/34* (2013.01); *B23Q 5/326* (2013.01); *B23Q 5/402* (2013.01);
(Continued)

(58) Field of Classification Search
CPC ......... B23B 37/00; B23B 47/34; B23Q 5/326; B23Q 5/402; H01L 41/09
(Continued)

(56) References Cited

U.S. PATENT DOCUMENTS

2008/0043304 A1* 2/2008 Stalford ............... B81B 3/0062
359/196.1

FOREIGN PATENT DOCUMENTS

| CH | 676 097 A5 | 12/1990 |
| FR | 2 907 695 A1 | 5/2008 |
| FR | 2 915 121 A1 | 10/2008 |

OTHER PUBLICATIONS

International Search Report dated Aug. 4, 2014 issued in corresponding International patent application No. PCT/FR2014/051350.

* cited by examiner

*Primary Examiner* — Thomas Dougherty
(74) *Attorney, Agent, or Firm* — Ostrolenk Faber LLP

(57) ABSTRACT

A machining device including a casing, a transmission shaft (3) and a drive mechanism (1) including a first gearing member (13) that is able to rotate the shaft about its axis (A), a second gearing member (17) that is in a helicoidal connection with the shaft in order to drive the shaft translationally along its axis in a feed movement, depending on the relative rotational speed of the first and second gearing members, and means for generating axial oscillations. The second gearing member (17) is able to move translationally along the axis (A) with respect to the casing, the means for generating axial oscillations including an electromechanical actuator (20) mounted at a fixed location, connected to the casing, and able to be coupled axially to the second gearing member (17) in order to make it oscillate translationally, so as to superimpose an axial oscillation component on said feed movement.

11 Claims, 1 Drawing Sheet

(51) Int. Cl.
  *B23B 47/34*    (2006.01)
  *B23Q 5/32*    (2006.01)
  *B23Q 5/40*    (2006.01)
(52) U.S. Cl.
  CPC ... *B23B 2260/066* (2013.01); *B23B 2260/102* (2013.01); *B23B 2260/108* (2013.01)
(58) Field of Classification Search
  USPC ............ 310/323.01, 323.02, 323.18, 328, 26
  See application file for complete search history.

VIBRATORY MACHINING DEVICE

CROSS REFERENCE TO RELATED APPLICATIONS

The present application is a 35 U.S.C. § 371 National Phase conversion of PCT/FR2014/051350, filed Jun. 5, 2014, which claims benefit of French Application No. 1355224, filed Jun. 6, 2013, the disclosure of which is incorporated herein by reference. The PCT International Application was published in the French language.

TECHNICAL FIELD OF THE INVENTION

The present invention relates to the field of devices for machining components, such as drilling devices and, more particularly, those that incorporate a feed movement for the cutting tool, for example for the drill bit.

BACKGROUND OF THE INVENTION

Such a device is well known to a person skilled in the art, in particular for example from the patent document FR 2 907 695, which describes a machine, referred to as a drilling unit, having a drive mechanism provided with a drive pinion that is mounted in a fixed manner in terms of rotation on a tool holding spindle so as to rotate the latter while allowing said drive pinion to move axially, and a feed pinion coupled to the tool-holding spindle by a helicoidal connection so as to drive the spindle translationally along its axis, in a feed movement, depending on the relative rotational speed of the drive pinion and feed pinion.

Unlike numerical control machines or other drilling means that use electric motors, drilling units generally only have a (pneumatic or electric) motor which rotates the tool, via the drive mechanism, about its axis and simultaneously feeds it or returns it by translational movement along its axis. Since the translational and rotational movements are mechanically connected, the operational parameters of the drilling units are fixed by the choice of pinions and are constant throughout the drilling cycle. In particular the ratio between the rotational speed and the feed rate is imposed kinematically, thereby giving a constant feed per revolution, which therefore cannot be adapted optimally depending on the materials drilled. Thus, if such a machine proves to be generally satisfactory, it can prove tricky to use it to drill deep bores and/or multimaterial stacks.

Specifically, in this context, it can prove difficult to evacuate chips formed during drilling. If chips become jammed, this can result in the breakage of or significant wear to the drilling tool, deterioration of the state of the surfaces generated, more particularly during operations of drilling stacks made of different materials, or a significant drop in productivity, in particular by the limitations imposed by the cutting parameters such as the speed of rotation or the feed rate.

One remedy to this drawback consists in causing the breakup of these chips by varying the thickness thereof, by virtue of discontinuous drilling. Thus, the drilling machine described in the abovementioned patent document is provided with a system of displacing the feed pinion with respect to the casing of the machine, said system being in the form of a cam/cam follower assembly, a first of these elements being fixed in terms of rotation to the spindle and the other being fixed in terms of rotation to the feed pinion, making it possible to impose an oscillating movement on the feed movement of the spindle along its axis during drilling.

Thus, during the feed of the drilling tool, these axial oscillations vary the thickness of the chips, thereby allowing them to be broken up and evacuated. However, this results in friction at the cam, which causes heat, wear and noise. Moreover, the frequency of the oscillations depends on the relative speed of rotation between the feed pinion and the tool-holding spindle and does not always make it possible to obtain optimal oscillation frequencies for good breakup of the chips, since the number of oscillations per revolution remains constant. Consequently, such a machine could not be adapted to multiple machining configurations, for example to drilling with drill bits having two edges or with a single edge, for which the number of oscillations per revolution needs to be different. Moreover, the architectures proposed by the abovementioned patent did not make it possible to be able to stop oscillation excitation depending on the nature of the machining process. However, such a stop may become necessary, for example if the same tool needs to carry out drilling followed by the production of a bevel, the latter requiring a feed movement without superimposed oscillations. Further optimizations of the vibrating assistance for the breakup of the chips are also impossible with known principles, for example real-time variation, during the drilling operation, of the amplitude or the frequency of the imposed oscillations, or the generation of oscillation shapes other than a sinusoid, for example a sawtoothed oscillation shape.

SUMMARY OF THE INVENTION

Therefore, it is an aim of the present invention to propose an improved machining device, in particular a drilling device for breaking up chips during drilling by superimposing axial oscillations on the feed movement of the tool, which does not have at least one of the abovementioned limitations and, in particular, is easy to implement, takes up little space and the oscillation characteristics of which are easily adaptable.

To this end, the subject of the present invention is a machining device comprising a casing, a transmission shaft that extends along an axis and is able to be coupled to a cutting tool, and a drive mechanism for driving the transmission shaft, said mechanism comprising a first gearing member that is coupled to the transmission shaft and is able to drive the transmission shaft rotationally about its axis with respect to the casing, a second gearing member that is in a helicoidal connection with the transmission shaft and is able to drive the transmission shaft translationally along its axis in a feed movement with respect to the casing, depending on the relative rotational speed of said first and second gearing members, and means for generating axial oscillations that are able to generate an oscillating feed movement of the transmission shaft along its axis.

According to the invention, said second gearing member is able to move translationally along the axis with respect to said casing, said means for generating axial oscillations comprising an electromechanical actuator mounted at a fixed location, connected to said casing, said electromechanical actuator being able to be coupled axially to said second gearing member in order to make it oscillate translationally, so as to superimpose an axial oscillation component on said feed movement.

According to further advantageous features of the machining device in accordance with the invention, taken on their own or in combination:

said electromechanical actuator butts with one of its ends against an axial annular end stop fixed to said casing;

said axial annular end stop comprises elastic damping means by way of which said end of said electromechanical actuator butts against said axial annular end stop;

axial coupling means for coupling said second gearing member to an oscillating free end of said electromechanical actuator can be provided, making it possible to limit friction between the oscillating free end of said electromechanical actuator that is mounted in a rotationally fixed manner about the axis and said second gearing member that is rotated about the axis;

said axial coupling means comprise a rolling-bearing means having a fixed raceway formed on a fixed race that is attached to the transmission shaft and intended to be joined to the free end of said electromechanical actuator, and a rotating raceway intended to be joined to said second gearing member, rotating elements being disposed between said fixed and rotating raceways;

said rotating raceway is formed either directly on said second gearing member or on a rotating race attached to the second gearing member;

said second gearing member is in a sliding connection in the direction of the axis with a holder, said holder receiving a rotary movement and being in a pivoting connection with respect to said casing;

said sliding connection between said second gearing member and said holder in the direction of the axis is realized by elastic guide means;

said device can comprise a sliding pivot between said second gearing member and said casing;

an elastic return mechanism for returning the second gearing member into a nominal axial position with respect to the casing can be provided, the elastic return mechanism being designed to allow the movements of the second gearing member with respect to the casing in the direction of the axis under the effect of said actuator, while urging the second gearing member in an axial direction opposite to the direction of the feed movement of the shaft;

said electromechanical actuator can be a piezoelectric or magnetostrictive or electrostrictive actuator.

BRIEF DESCRIPTION OF THE DRAWINGS

Further particular features and advantages of the invention will become apparent from reading the description given below of one particular embodiment of the invention, which is given by way of nonlimiting example, with reference to the appended drawings, in which.

DESCRIPTION OF EMBODIMENTS

Figure 1:
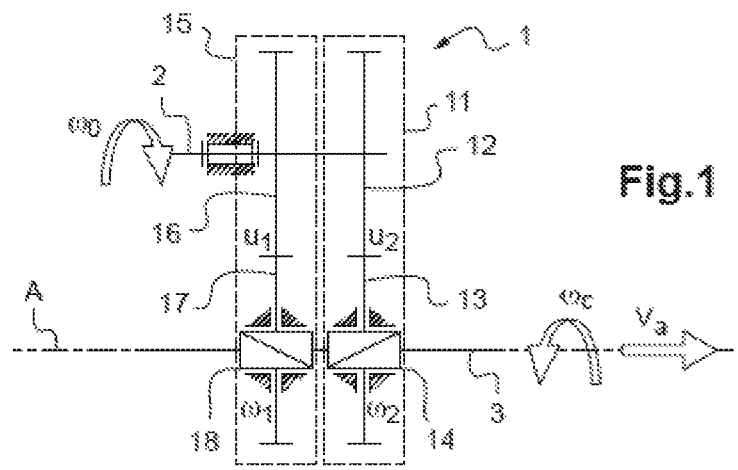
FIG. 1 is a diagram illustrating the kinematics of a drive mechanism for a drilling unit known as a drilling unit with a programmed feed, to which the invention can be applied.

FIG. 1 illustrates a conventional kinematic structure of a drilling device having a drive mechanism 1 that forms a drive mechanism known as a drive mechanism with a programmed feed, mechanically connecting an input transmission shaft 2 to an output transmission shaft 3 to which a cutting tool, in this case a drilling tool, is intended to be coupled. The shaft 2 of the drive mechanism is coupled to a drive motor or to a motor/reduction gear assembly. The assembly of these elements is housed at least partially in a casing of the drilling device and the output transmission shaft 3 is received in the casing so as to be movable rotationally about its axis A and translationally along this axis A.

According to the exemplary embodiment in FIG. 1, the drive mechanism 1 comprises a first gearing means 11, which makes it possible to convert the rotational movement of the input shaft 2 into a rotational movement of the output shaft 3. This first gearing means has for example a first drive sprocket 12, fixed to the input shaft 2, that engages with a first gearing member 13 coupled to the output shaft 3 such that the gearing member 13 rotates with the output shaft 3 while allowing a translational movement of the latter along its axis A with respect to the first gearing member 13, the connection between the first gearing member 13 and the output transmission shaft 3 being for example a sliding connection 14, the output transmission shaft 3 being able to have grooves in which corresponding ribs on the first gearing member 13 engage.

In accordance with the conventional drive mechanisms with a programmed mechanical feed, the drive mechanism 1 comprises a second gearing means 15 that makes it possible to convert the rotational movement of the input transmission shaft 2 into a feed movement of the output transmission shaft 3. This second gearing means 15 can comprise for example a second drive sprocket 16 that is coupled to the input shaft 2 and makes it possible to engage a second gearing member 17 coupled to the output shaft 3. The second gearing member 17 is coupled to the output transmission shaft 3 by way of a helicoidal connection 18 that makes it possible to convert the rotational movement of the second gearing member 17 relative to the output transmission shaft 3 into a corresponding translational movement of the output transmission shaft 3 along its axis A with respect to the casing, such that the output transmission shaft 3 is fed along the axis A with respect to the casing depending on the relative rotational speed of the first and second gearing members 13 and 17. Specifically, the helicoidal connection converts the rotational relative movement between the second gearing member 17 and the output transmission shaft 3 into a translational movement. The judicious choice of the two transmission ratios u1 and u2, between the second gearing member 17 and the second drive sprocket 16 and between the first gearing member 13 and the first drive sprocket 12, respectively, will make it possible to obtain a low feed rate (a few hundredths of a millimeter) while implementing a helicoidal connection with a pitch that is relatively large and easy to realize (a few millimeters).

Alternatively, the rotational movements of the gearing members 13 and 17 can also be provided by two parallel kinematic chains, which are more complex than those shown above, but which receive the drive movement from the same motor or motor/reduction gear pair.

It was explained above that the chips that are formed during the drilling of a material can be evacuated more easily if they are broken up at the same time as they are formed. Conventionally, attempts are made to make this breakup possible by imposing an oscillating feed movement on the drilling tool coupled to the output transmission shaft 3, by superimposing an oscillating movement on the feed movement generated by the second gearing member 17 via the helicoidal connection with the output shaft 3.

The solution proposed by the present invention for generating the oscillating feed movement can be applied to any machining device comprising a drive mechanism for driving the transmission shaft that has a kinematic chain as described with reference to FIG. 1, but can be applied, more widely, independently of the choice of kinematic chain designed to transmit movements to the output transmission shaft 3 and, in particular, designed to transmit the two rotational movements to the first and second gearing members 13 and 17, respectively. Thus, the solution which will now be described can be applied to any kinematic chain using an output transmission shaft coupled to a first gearing member that is able to drive the shaft rotationally about its axis inside a casing while leaving it free to move translationally, the casing housing a drive mechanism comprising a second gearing member coupled to the shaft by a helicoidal connection so as to bring about the automatic feed of the shaft along its axis relative to the casing under the effect of the rotational driving of the shaft, regardless of the way in which the difference between the speed of rotation $\omega 1$ of the second gearing member and the speed of rotation $\omega 2$ of the first gearing member is realized.

Figure 2:
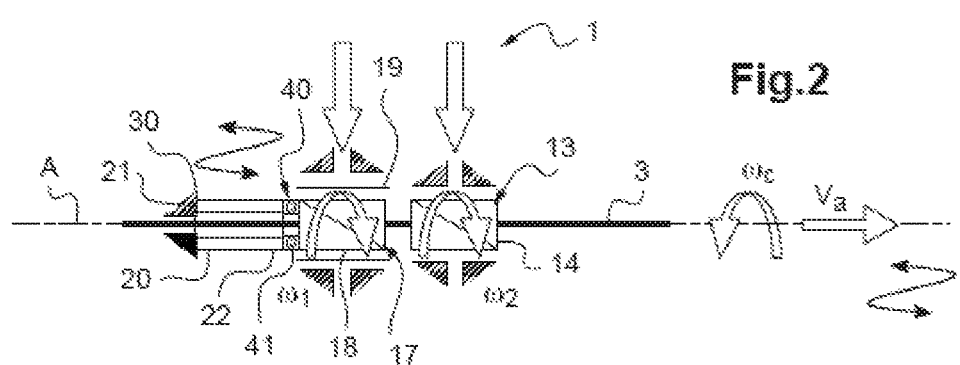
FIG. 2 is a diagram similar to FIG. 1, illustrating the arrangement of the guide part of the shaft according to one embodiment of the invention, in order to combine the feed movement of the output transmission shaft with an oscillating movement along the axis.

As illustrated in FIG. 2, the second gearing member 17, coupled to the output transmission shaft 3 by way of the helicoidal connection 18, is able to move axially inside the casing along the axis A. To this end, the second gearing member 17, which is driven rotationally relative to the casing, is in a sliding connection of axis A with a holder 19, which is itself in a pivoting connection with respect to the casing. This sliding connection has the particular feature of having to ensure a low-amplitude travel, equal to the amplitude of the oscillations which will be imposed, typically around a tenth of a millimeter, preferably from 0.1 to 0.2 mm. Thus, although it can be realized by conventional means for a sliding connection (plain bearing, bearing pads having rolling elements etc.), it can also be realized by elastic guide means which can be similar to a sliding connection with a small travel. Alternatively, a sliding pivot that slides in the direction of the axis A can be arranged between the second gearing member 17 and the casing, such that the second gearing member 17, intended to impose the feed movement on the output transmission shaft 3, is able to move translationally with respect to the casing along the axis A. Moreover, the output transmission shaft 3 is fixed in terms of translational movement to the second gearing member 17 on account of the helicoidal connection 18 therebetween, the second gearing member 17 forming the nut element of this helicoidal connection 18 that is screwed onto a threaded portion of the output shaft 3.

In accordance with the invention, the means for generating axial oscillations that are intended to allow an oscillating feed movement of the output transmission shaft 3 along its axis A comprise an electromechanical actuator 20, for example of the piezoelectric type, the oscillations of which, which are brought about by a variable voltage applied thereto, are oriented along the axis A. The actuator 20 can also be of the magnetostrictive or electrostrictive type or of the type using any other type of medium and physical phenomena, for example electrohydraulic or electropneumatic, that are capable of providing an oscillation generated by an external control signal.

The electromechanical actuator 20, having a tubular shape, is threaded onto the output transmission shaft 3 behind the second gearing member 17 that constitutes the nut element of the helicoidal connection 18 with the output transmission shaft 3, and is intended to be coupled axially to the second gearing member 17 in order to make it oscillate translationally along the axis A, when it is made to, so as to superimpose an axial oscillation component on the feed movement of the shaft that is imposed by the second gearing member 17.

The electromechanical actuator 20 is advantageously mounted at a fixed location, connected to the casing, and in other words it does not rotate about the axis A of the output shaft 3 relative to the casing, thereby greatly simplifying its power supply, thus avoiding the necessity to use complex and expensive solutions, for example of the slip ring type based on sliding contacts. To this end, the electromechanical actuator 20 butts by way of one of its ends 21 against an axial annular end stop 30 fixed to the casing, so as to leave the actuator 20 in a fixed location. The axial annular end stop 30 may comprise elastic damping means (not shown) interposed between the stop itself and the end 21 of the electromechanical actuator 20 intended to butt against the stop 30.

In front of the electromechanical actuator 20 that is mounted in a rotationally fixed manner about the axis A, an oscillating free end 22 of the actuator 20, which is situated away from the end 21 axially butting against the block 30 fixed to the casing, is intended to be coupled to the second gearing member 17 in order to make it oscillate translationally along the axis A through the sliding connection 19, so as to superimpose an axial oscillation component on the uniform feed movement of the shaft 3 along the axis A, generated on the basis of the rotational relative movement between the second gearing member 17 and the output transmission shaft 3.

The second gearing member 17 is preferably mounted so as to be able to move axially with respect to the casing in the direction of the axis A by way of an elastic return mechanism (not shown) for returning the second gearing member 17 into a nominal axial position with respect to the casing. The elastic return mechanism associated with the sliding connection or with the sliding pivot is designed to allow movements of the second gearing member 17 with respect to the casing in the direction of the axis A under the effect of the actuator 20, while urging the second gearing member 17 in an axial direction opposite to the direction of the feed movement of the shaft 3. Therefore, the second gearing member 17 is urged to be coupled to the oscillating free end 22 of the actuator 20 by the elastic return mechanism.

The coupling between the oscillating free end 22 of the electromechanical actuator 20 and the second gearing member 17 can be brought about by axial coupling means 40, making it possible to limit friction between the oscillating free end 22 of the actuator 20, mounted in a rotationally fixed manner about the axis A, and the second gearing member 17 that is rotationally driven about the axis A. These axial coupling means 40 can be implemented in the form of a rolling-bearing means 41 comprising a fixed raceway, formed on a fixed race that is attached to the output shaft 3 in a movable manner with respect to the casing along the axis A and is intended to be joined to the oscillating free end 22 of the electromechanical actuator 20, and a rotating raceway, intended to be fixed to the second gearing member 17, while rotating elements are disposed between the fixed and rotating raceways. The rotating raceway can be formed either directly on the second gearing member or on a rotating race attached to the second gearing member.

The machining device according to the invention provides better control of the axial oscillations combined with the feed movement of the shaft, in particular because the electromechanical actuator used is controllable in real time by control means that react to a simple adjustment of the characteristics of its power supply. Thus, it is possible to regulate both the amplitude and frequency of the oscillations, including during an ongoing drilling operation, this being particularly advantageous for implementing an adaptive drilling process, in particular in order to take into account the various materials which are passed through in one and the same operation, or the particular configuration of the machining process, for example in the case of a combined operation in which drilling followed by beveling is carried out with a single tool. The machining device according to the invention also makes it possible, by virtue of the control of the electromechanical actuator, to introduce oscillations having a shape other than a sinusoidal shape, for example having a sawtoothed shape, this, combined with the possibility of adaptive adjustment in real time of the characteristics of frequency and amplitude of the oscillations imposed, making it possible to extend the lifetime of the cutting tool, for example of the drilling tool in the context of the application to drilling.

Finally, the solution according to the invention, as has just been described for combining the feed movement of the output transmission shaft with an oscillating movement along its axis, could be easily adapted to any type of machining unit, given that operations other than drilling remain possible and inasmuch as the means used to generate the axial oscillations intervene only in the guiding part of the shaft, independently of the kinematic chain which provides the two rotational movements to the first gearing member 13 for rotationally driving the shaft about its axis and to the second gearing member 17 for translationally driving the shaft along its axis, respectively. Thus, the solution proposed could be used for example in the design of a machining means of the electric spindle type, thereby gaining the advantage of integrating the feed movement into said machining means and of vibrating assistance.

What is claimed is:

1. Machining device comprising a casing, a transmission shaft that extends along an axis and is able to be coupled to a cutting tool, and a drive mechanism for driving the transmission shaft, said mechanism comprising a first gearing member that is coupled to the transmission shaft and is able to drive the transmission shaft rotationally about its axis with respect to the casing, a second gearing member that is in a helicoidal connection with the transmission shaft and is able to drive the transmission shaft translationally along its axis in a feed movement with respect to the casing, depending on the relative rotational speed of said first and second gearing members, and means for generating axial oscillations that are able to generate an oscillating feed movement of the transmission shaft along its axis, characterized in that said second gearing member is able to move translationally along the axis with respect to said casing, said means for generating axial oscillations comprising an electromechanical actuator mounted at a fixed location, connected to said casing, said electromechanical actuator being able to be coupled axially to said second gearing member in order to make it oscillate translationally, so as to superimpose an axial oscillation component on said feed movement.

2. Device according to claim 1, wherein said electromechanical actuator butts with one of its ends against an axial annular end stop fixed to said casing.

3. Device according to claim 2, wherein said axial annular end stop comprises elastic damping means by way of which said end of said electromechanical actuator butts against said axial annular end stop.

4. Device according to claim 1, further comprising axial coupling means for coupling said second gearing member to an oscillating free end of said electromechanical actuator, making it possible to limit friction between the oscillating free end of said electromechanical actuator that is mounted in a rotationally fixed manner about the axis and said second gearing member that is rotated about the axis.

5. Device according to claim 4, wherein said axial coupling means comprise a rolling-bearing means having a fixed raceway formed on a fixed race that is attached to the transmission shaft and intended to be joined to the free end of said electromechanical actuator, and a rotating raceway intended to be joined to said second gearing member, rotating elements being disposed between said fixed and rotating raceways.

6. Device according to claim 5, wherein said rotating raceway is formed either directly on said second gearing member or on a rotating race attached to the second gearing member.

7. Device according to claim 1, wherein said second gearing member is in a sliding connection in the direction of the axis with a holder, said holder receiving a rotary movement and being in a pivoting connection with respect to said casing.

8. Device according to claim 7, wherein said sliding connection between said second gearing member and said holder in the direction of the axis is realized by elastic guide means.

9. Device according to claim 1, further comprising a sliding pivot between said second gearing member and said casing.

10. Device according to claim 1, characterized in that it comprises further comprising an elastic return mechanism for returning the second gearing member into a nominal axial position with respect to the casing, the elastic return mechanism being designed to allow the movements of the second gearing member with respect to the casing in the direction of the axis under the effect of said actuator, while urging the second gearing member in an axial direction opposite to the direction of the feed movement of the shaft.

11. Device according to claim 1, wherein said electromechanical actuator is a piezoelectric or magnetostrictive or electrostrictive actuator.

* * * * *